United States Patent

Bruner

[15] 3,678,385

[45] July 18, 1972

[54] ASSEMBLY AND TEST DEVICE FOR MICROELECTRONIC CIRCUIT MEMBERS

[72] Inventor: Peter Martin Bruner, Mechanicsburg, Pa.

[73] Assignee: AMP Incorporated, Harrisburg, Pa.

[22] Filed: Sept. 26, 1969

[21] Appl. No.: 861,274

[52] U.S. Cl. ..........................324/158 F, 29/574, 339/17 CF

[51] Int. Cl. ..........................G01r 31/22, H05k 1/00

[58] Field of Search ..................324/158, 158 F; 339/17, 174; 174/52.5, DIG. 3; 29/574, 576, 577, 588, 589, 590, 591, 203 B, 203 J, 593

[56] References Cited

UNITED STATES PATENTS

| | | | |
|---|---|---|---|
| 3,297,974 | 1/1967 | Pittman | 324/158 X |
| 3,335,327 | 8/1967 | Damon et al. | 324/158 X |
| 3,380,016 | 4/1968 | Samson et al. | 339/174 |
| 3,391,383 | 7/1968 | Antes | 339/174 |
| 3,469,684 | 9/1969 | Keady et al. | 174/52.5 X |
| 3,385,426 | 5/1968 | May | 174/DIG. 3 |
| 3,444,440 | 5/1969 | Bell | 174/DIG. 3 |
| 3,436,451 | 4/1969 | Wasser | 174/DIG. 3 |

OTHER PUBLICATIONS

Compact Contactor For IC Flat-Packs; EE, The Electronic Engineer; April 1967; page 119.

*Primary Examiner*—Rudolph V. Rolinec
*Assistant Examiner*—Ernest F. Karlsen
*Attorney*—Curtis, Morris and Safford, Marshall M. Holcombe, William Hintze, William J. Keating, Frederick W. Raring, Hopkins, John R., Adrian J. La Rue and Jay L. Seitchik

[57] ABSTRACT

An assembly and test device for microelectronic circuit members has a circuit-holding member provided with an area in which a microelectronic circuit member is disposed and grooves are in communication with the area. A lead frame-holding member has an opening in which the circuit-holding member is positioned and it has grooves for receiving leads of a lead frame, these grooves being disposed in alignment with the grooves of the circuit-holding member when the holding members are latchably secured together. A pressure-applying member is latchably secured onto the lead frame-holding member and it is provided with ribs that are mateable with the aligned grooves of the circuit-holding and lead frame-holding members so that ends of the leads are held in engagement with terminals of the microelectronic member in order that the ends of the leads can be soldered or welded onto the terminals, the ribs also hold the leads in engagement with electrical connectors of the lead frame-holding member. The lead frame-holding member with the circuit-holding member and the pressure-applying member in position thereon after the leads have been connected to the terminals on the microelectronic member and the leads have been severed from the lead frame is connected as an assembly onto a test board with electrical connectors thereon mated with the electrical connectors of the lead frame-holding member to test the electrical connections between the leads and the terminals and the operation of the microelectronic member over a predetermined time.

1 Claim, 6 Drawing Figures

INVENTOR

PETER MARTIN BRUNER

BY Adrian J. LaRue

INVENTOR
PETER MARTIN BRUNER

BY Adrian J. LaRue

ASSEMBLY AND TEST DEVICE FOR MICROELECTRONIC CIRCUIT MEMBERS

This invention relates to an assembly and test device and more particularly to an assembly and test device for use in assembling leads onto a microelectronic circuit member and testing the microelectronic circuit member.

In the field of microelectronic circuits, it is known to provide carriers which carry microelectronic circuits such as, for example, flat packs, integrated circuits and large scale integrated circuits. These carriers are provided with electrical terminals for connection with the leads of the microelectronic circuits and the terminals are for electrical connection with circuit paths on a printed circuit board either by flow solder techniques or mateable with sockets disposed in the printed circuit board and connected to the circuit paths.

An object of the present invention is to provide an assembly device in which a microelectronic circuit means is connected to leads.

Another object is the provision of a test device for testing connections of leads to a microelectronic circuit member and the operation of the circuit.

A further object is to provide an assembly and test device in which an assembled and tested microelectronic circuit member can be potted to form a completed circuit.

An additional object is the provision of an assembly and test device having means to precisely position leads relative to a substrate.

A still further object is to provide an assembly and test device having elements that are readily snappable together to properly position a substrate and leads to be connected thereto and to maintain the leads in position while they are being connected to the substrate.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

Figure 1:
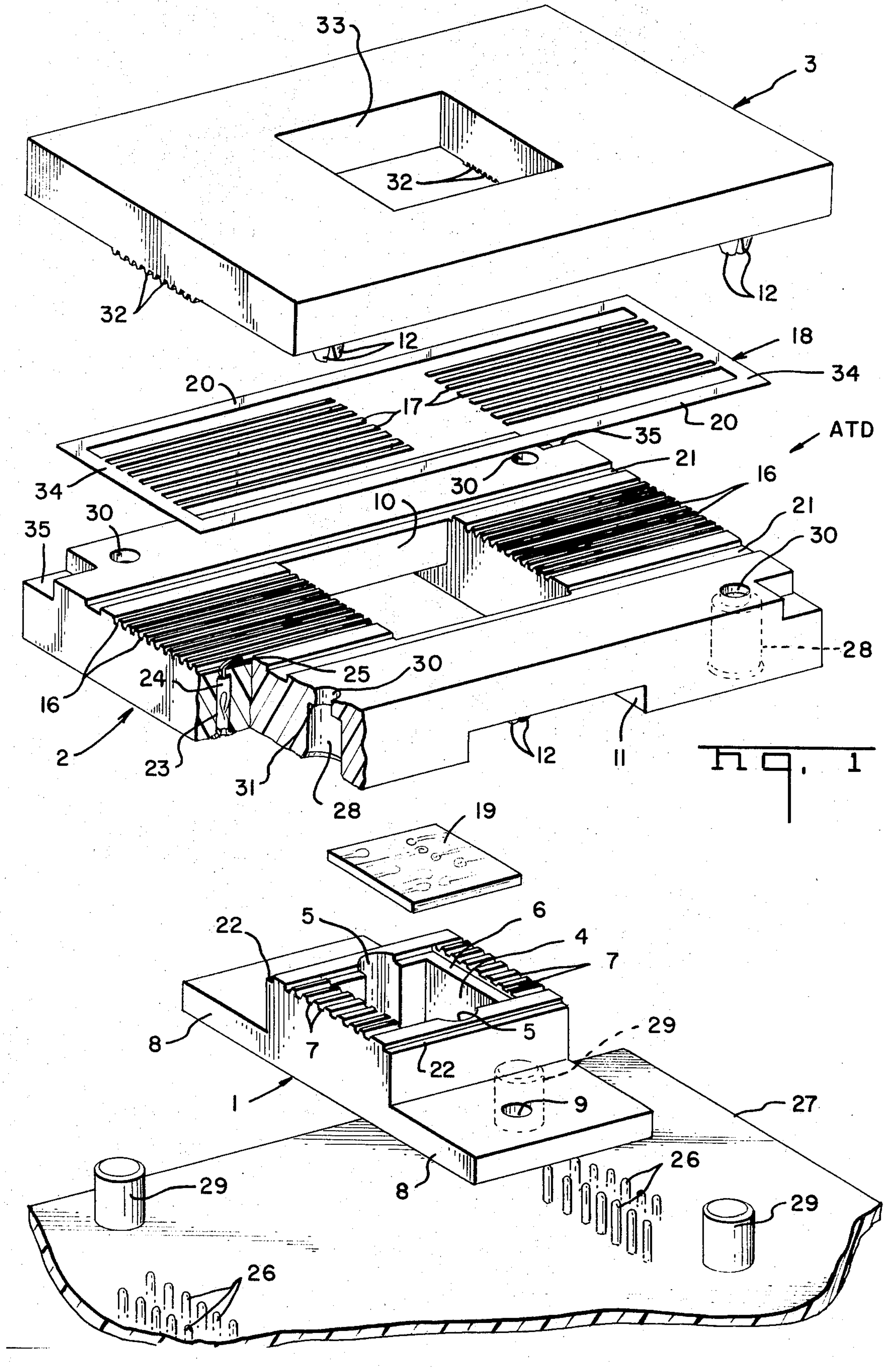
FIG. 1 is an exploded perspective view of the elements of the assembly and test device and the substrate and lead frame.

An assembly and test device ATD comprises a substrate holder 1, a lead frame holder 2 and a cap 3. Substrate holder 1 has a rectangular opening 4 extending therethrough. Recesses 5 are provided in opposing sides of opening 4 and a recessed area 6 having ledges is provided at the top of opening 4. A series of channels or grooves 7 is provided in a top surface of holder 1 on opposite sides of opening 4 and they are in communication with respective ledges of recessed area 6. Projections 8 extend outwardly from opposite sides of holder 1 and they have holes 9 therein.

Figure 2:
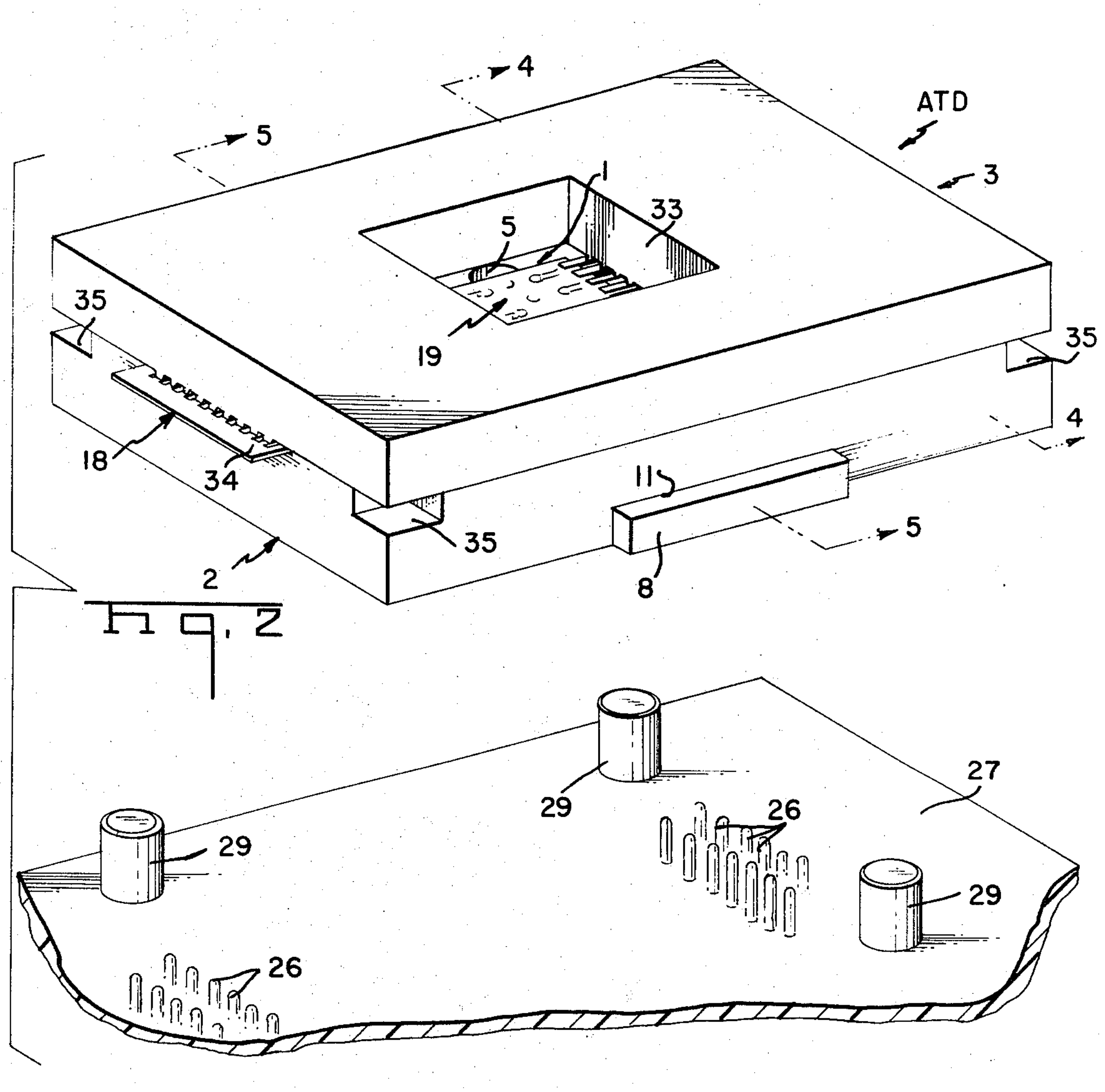
FIG 2 is an exploded perspective view of the assembly and test device in an assembled condition with the leads of the lead frame properly positioned relative to the substrate and this device is disposed above a printed circuit board onto which the device is to be connected.
Figure 3:
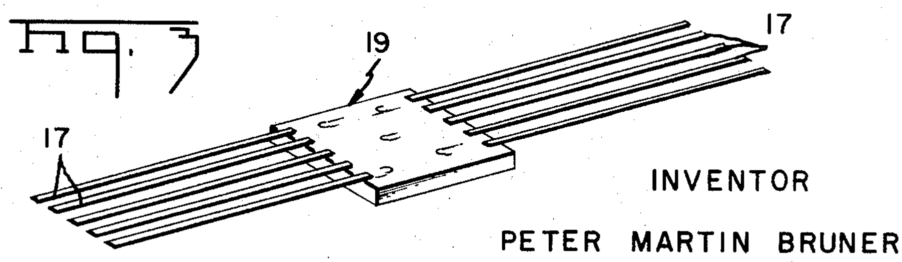
FIG. 3 is a perspective view of a completed microelectronic circuit member.
Figures 4, 5:
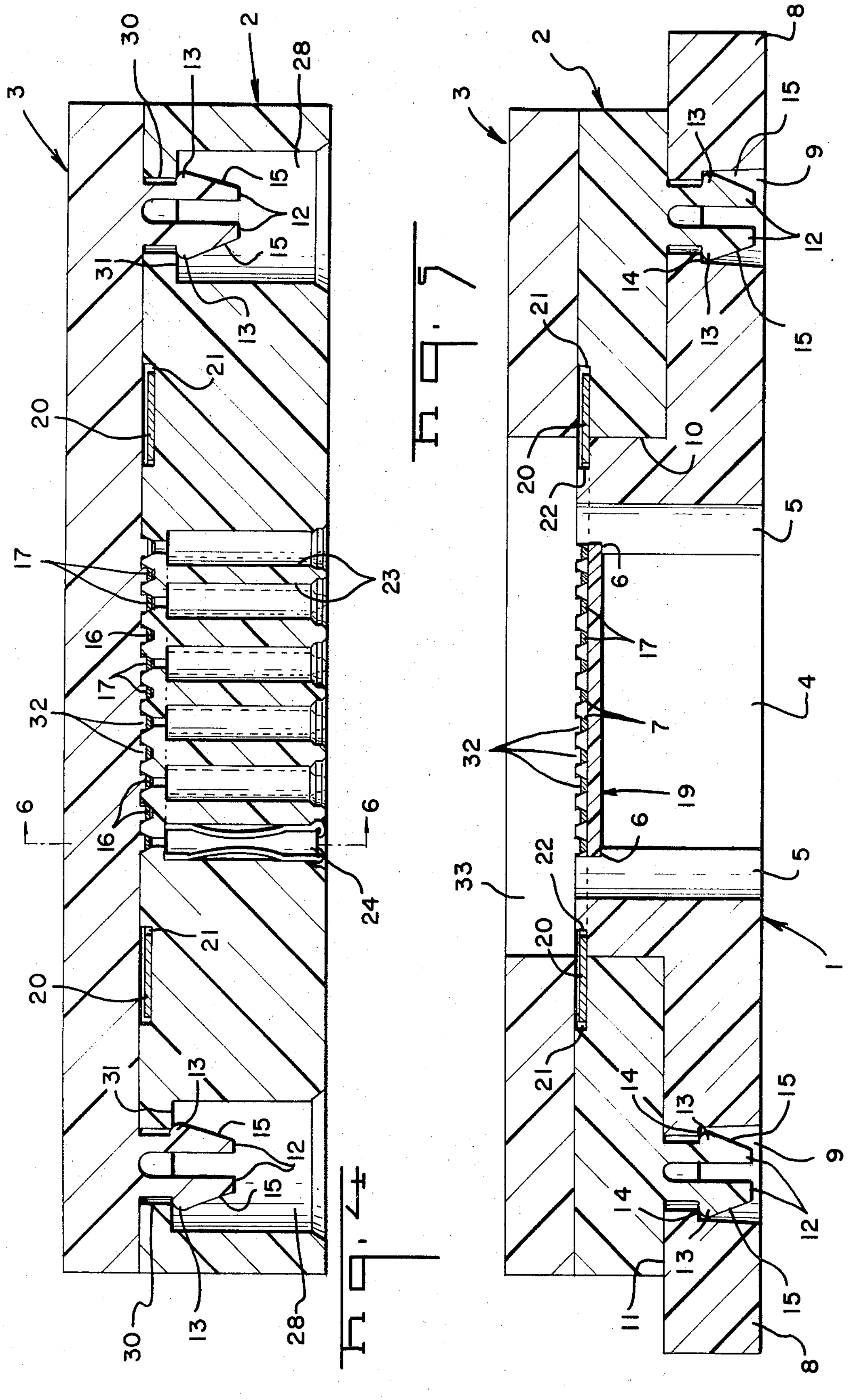
FIG. 4 is a view taken along lines 4—4 of FIG. 2.
FIG. 5 is a view taken along lines 5—5 of FIG. 2.
Figure 6:
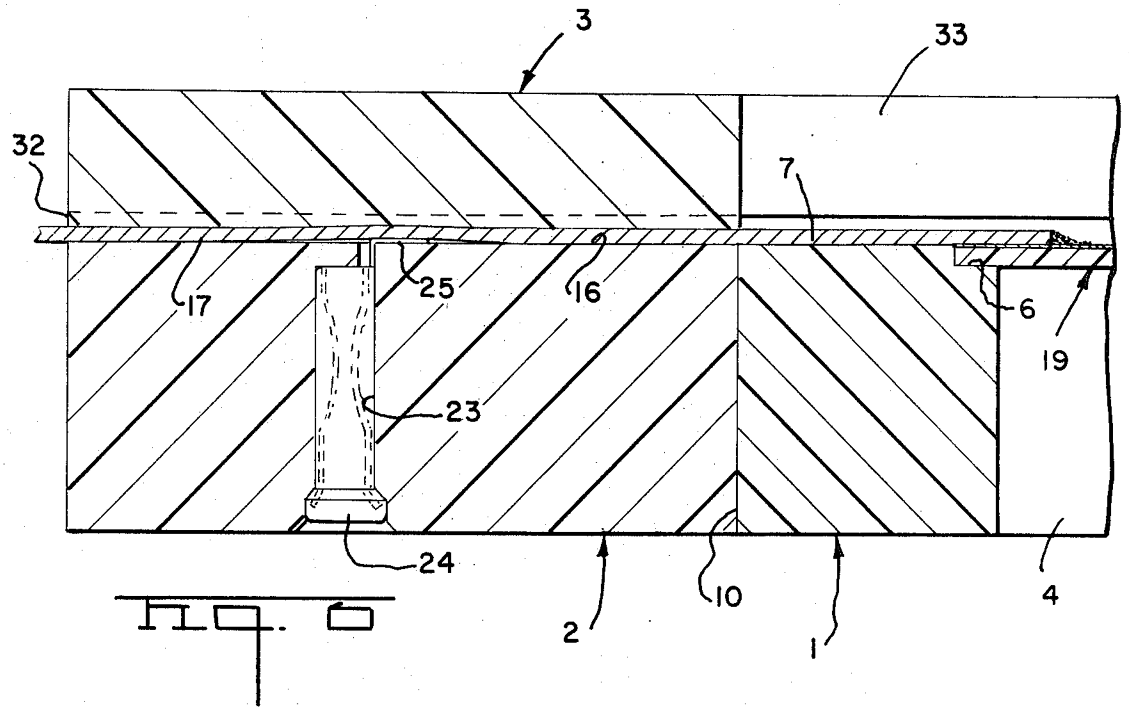
FIG. 6 is a view taken along lines 6—6 of FIG. 4.

Lead frame holder 2 has an opening 10 and recess 11. The main portion of substrate holder 1 is disposed in opening 10 and projections 8 are accommodated in recess 11 and held in position therein by means of stiffly-flexible, bifurcated latching members 12 which mate with holes 9 and they have projections 13 which resiliently engage stepped sections 14 of holes 9 to thereby maintain substrate holder 1 and lead frame holder 2 in latchable engagement. Tapered surfaces 15 are provided on latching members 12 to facilitate the engagement of latching members 12 with holes 9. As can be discerned from FIGS. 2 and 5, a part of each projection 8 extends outwardly from lead frame holder 2 to enable substrate holder 1 to be grasped so as to be disconnected from lead frame holder 2.

The top surface of lead frame holder 2 on opposite sides of opening 10 is provided which channels or grooves 16 which are in alignment with channels 7 when substrate holder 1 is positioned on lead frame holder 2 so that these aligned channels can receive leads 17 of lead frame assembly 18 thereby properly positioning the inner free ends of leads 17 relative to the terminals on substrate 19 to which they are to be connected. Substrate 19 is a conventional chip having microelectronic circuitry thereon and it is disposed in recessed area 6. Sides 20 of lead frame assembly 18 are positioned in channels 21 of lead frame holder 2 and recesses 22 of substrate holder 1.

Staggered openings 23 are provided at each end of holder 2 and electrical sockets 24 are secured in each opening. Sockets 24 are provided with tabs 25 which are disposed in respective channels 16 for electrical engagement with leads 17. Tabs 25 are disposed at a slight angle in channels 21 so that the free ends thereof extend toward the open ends of the channels. Sockets 24 are electrically engageable with staggered pins 26 located on printed circuit board 27. Pins 26 are electrically connected to conductive paths on printed circuit board 27 to test the connections and the circuitry on substrate 19 for a predetermined period of time in order to assure the operation of substrate 19 and the integrity of the connections of leads 17 thereto.

Holes 28 in lead frame holder 2 mate with posts 29 mounted on printed circuit board 27 in order to properly guide sockets 24 in engagement with pins 26. Holes 28 and posts 29 are also oriented in a polarized manner in order to assure the proper electrical engagement of sockets 24 with pins 26 to make sure that the electrical circuitry on printed circuit board 27 is properly connected to the circuitry of substrate 19.

Cap or pressure-applying member 3 is latchably mounted onto holder 2 by means of latching members 12 which are disposed in small sections 30 of holes 28 so that projections 13 engage stepped sections 31 to latchably secure cap 3 in position. Projections or ribs 32 extend outwardly from an inside surface of cap 3 and each projection 32 mates with a respective channel 16 in holder 2 to thereby maintain the inner free ends of leads 17 in engagement with the respective terminals on substrate 19 so that they can be soldered or welded thereto and to maintain leads in electrical engagement with tab 25 which are pressed into engagement with the bottoms of channels 16.

Rectangular opening 33 is provided in cap 3 to permit access to substrate 19 and the inner free ends of leads 17 so that they can be connected to the terminals on substrate 19 and to permit encapsulation of the completely tested microelectronic circuit by conventional potting techniques. Of course, ends 34 of lead frame assembly 18 are severed from the lead frame assembly prior to placing assembly and test device ATD on the printed circuit board for testing the connections of leads 17 to substrate 19 and the electronic circuitry thereof. Recesses 35 are provided in holder 2 to permit insertion of a tool such as, for example, a screwdriver to urge cap 3 out of latching engagement with holder 2 so that the microelectronic circuit can be removed from the assembly and test device. Recesses 5 in substrate holder 1 permit the insertion of ends of tweezers to engage the encapsulated microelectronic circuit to lift the microelectronic circuit from substrate holder 1.

It will, therefore, be appreciated that the aforementioned and other desirable objects have been achieved; however, it should be emphasized that the particular embodiment of the invention, which is shown and described herein, is intended as merely illustrative and not as restrictive of the invention.

The invention is claimed in accordance with the following:

1. An assembly and testing device for a microelectronic circuit member, comprising:

a circuit member holder having a projecting rim, a recess defined by said rim for removably receiving a microelectronic circuit member below the surface of said rim, a plurality of grooves in said rim and in alignment with respective circuit paths on said microelectronic circuit member for receiving respective leads of a lead frame member in registration in said grooves and in registration with the respective circuit paths of said microelectronic circuit member, a lead frame holding-member freely and removably receiving said circuit member holder for supporting said lead frame above the level of said microelectronic circuit member, a plurality of grooves in said lead frame holding-member in alignment with respective grooves of said circuit member holder for receiving the respective leads of said electrically in contact with respective circuit paths of said microelectronic circuit member, a removable pressure-applying member overlying said lead frame holding-member and provided with a plurality of ribs received respectively in said grooves of said lead frame holding-member in order to register against and apply pressure upon the respective leads of said lead frame, a plurality of electrical sockets contained in said lead frame holding-member, said sockets having their axes entering parallel to each other and normally of said grooves in said lead frame holding-member, each of said sockets having a contact tab extending into one of said grooves in said lead frame holding-member, and said lead frame holding-member and said pressure-applying member having aligned openings therein overlying said microelectronic circuit member for exposing the circuit paths of said microelectronic circuit member whereby upon locating a microelectronic circuit member on said recess in said circuit member holder, positioning a lead frame on said lead frame holding-member with the leads thereof disposed in said grooves in said lead frame holding-member, and upon assembling said lead frame holding-member to said circuit member holder and assembling said pressure applying member to said lead frame holding-member, said leads of said lead frame are effectively connected to said contact tabs of said sockets and said leads are connected to terminals of said circuit member, and said circuit member can be tested by plugging said lead frame holder to test terminals of a testing apparatus and said circuit member can thereafter be encapsulated by introducing potting material into said aligned openings.

* * * * *